United States Patent
Gallagher et al.

(10) Patent No.: US 7,373,329 B2
(45) Date of Patent: May 13, 2008

(54) SYSTEMS AND METHODS FOR IMPLEMENTING PERSON-TO-PERSON MONEY EXCHANGE

(75) Inventors: Paul Gallagher, San Francisco, CA (US); Steve Davis, San Leandro, CA (US); Kaycie Roberts, San Francisco, CA (US); Robert Simon, San Francisco, CA (US); Michael Baum, San Francisco, CA (US); Mieko Schmandt, Portola Valley, CA (US); Peihuan Meng, Redwood City, CA (US); Ivan Liu, Redwood City, CA (US); Jorge Noa, San Francisco, CA (US); Martin Hampton, Belmont, CA (US)

(73) Assignee: Yahoo, Inc., Sunnyvale, CA (US)

( * ) Notice: Subject to any disclaimer, the term of this patent is extended or adjusted under 35 U.S.C. 154(b) by 0 days.

(21) Appl. No.: 10/727,303

(22) Filed: Dec. 2, 2003

(65) Prior Publication Data

US 2004/0111367 A1 Jun. 10, 2004

Related U.S. Application Data

(63) Continuation of application No. 09/639,014, filed on Aug. 15, 2000, now Pat. No. 7,031,939.

(51) Int. Cl.
*G06Q 40/00* (2006.01)
(52) U.S. Cl. ....................................................... 705/39
(58) Field of Classification Search .................. 705/35, 705/29, 64
See application file for complete search history.

(56) References Cited

U.S. PATENT DOCUMENTS 5,406,584 A 4/1995 Erisman (Continued)

FOREIGN PATENT DOCUMENTS

WO WO 00/16227 3/2000

(Continued)

OTHER PUBLICATIONS

Youngblood, Dick. Some hung up about paying bills via a computer. Star Tribune. Minneapolis, Minnesota. May 23, 1993. p. D02.*

(Continued)

*Primary Examiner*—James A. Kramer
*Assistant Examiner*—Jason Borlinghaus
(74) *Attorney, Agent, or Firm*—Brinks Hofer Gilson Lione (57) ABSTRACT

Systems for effecting online financial transactions between individuals are disclosed. Any user may initiate a send money transaction or a request payment transaction with any other entity provided that entity has an e-mail address. For a send money transaction, the user sending money (payor) enters an amount of funds to be transferred and an e-mail address of the recipient of the funds (payee). The transfer request may include an identity confirmation through which the payor confirms the identity of the payee. The system sends an e-mail message to the payee at the address provided indicating that the amount of funds has been "received" on the payee's behalf. The payee may open an online account or identify an existing online account to complete the transaction as well as provide identity confirmation for the payor. Upon confirmation, the transfer may occur.

20 Claims, 7 Drawing Sheets

U.S. PATENT DOCUMENTS

| | | | |
|---|---|---|---|
| 5,650,604 A * | 7/1997 | Marcous et al. | 235/379 |
| 5,757,917 A * | 5/1998 | Rose et al. | 705/79 |
| 5,903,878 A * | 5/1999 | Talati et al. | 705/26 |
| 6,032,136 A | 2/2000 | Brake et al. | |
| 6,039,250 A * | 3/2000 | Ito et al. | 235/380 |
| 6,044,360 A | 3/2000 | Picciallo | |
| 6,070,150 A | 5/2000 | Remington et al. | |
| 6,226,623 B1 | 5/2001 | Schein et al. | |
| 6,263,447 B1 * | 7/2001 | French et al. | 713/201 |
| 6,554,184 B1 | 4/2003 | Amos | |
| 2001/0034676 A1 | 10/2001 | Vasic | |
| 2002/0004772 A1 | 1/2002 | Templeton et al. | |
| 2002/0007343 A1 | 1/2002 | Oyama et al. | |
| 2002/0010640 A1 | 1/2002 | Dutta et al. | |
| 2002/0016769 A1 * | 2/2002 | Barbara et al. | 705/40 |
| 2002/0029190 A1 * | 3/2002 | Guitierrez-Sheris | 705/39 |
| 2002/0095298 A1 * | 7/2002 | Ewing | 705/1 |
| 2002/0095651 A1 | 7/2002 | Kumar et al. | |
| 2002/0152160 A1 | 10/2002 | Allen-Rouman et al. | |
| 2003/0004879 A1 | 1/2003 | Demoff et al. | |
| 2003/0140004 A1 * | 7/2003 | O'Leary et al. | 705/39 |
| 2004/0039649 A1 | 2/2004 | Mull | |
| 2004/0111370 A1 * | 6/2004 | Saylors et al. | 705/40 |
| 2005/0160051 A1 | 7/2005 | Johnson | |
| 2005/0187883 A1 | 8/2005 | Bishop et al. | |

FOREIGN PATENT DOCUMENTS

WO　　WO 00/28461　　5/2000

OTHER PUBLICATIONS

PR Newswire. Paypal.com becomes #1 online payment service on eBay. New York. Jan. 31, 2000. p. 1.*

Sapsford, Jathon. You've got mail (with cash?)—Paypal sees torrid growth with a service that sends money across the internet. Wall Street Journal (eastern edition). New York, N.Y. Feb. 16, 2000. p. B1.*

PR Newswire. VeriSign selected by CIBC to provide internet payment connectivity for new person-to-person payment service. New York. Jul. 31, 2000. p. 1.*

O'Brien, Jeanne. Bank One unveils e-mail money transfer service. Bank Systems & Technology. New York. vol. 37, iss. 5. May 2000. p. 24.*

Waring, Becky. Money is just a click away: Web services make person-to-person payments painless, paper-free. San Francisco Chronicle. San Francisco, California. Jul. 27, 2000. p. B1.*

Anypay, downloaded Apr. 22, 2003, http://www.anypay.com.

AfiliateForce/2000, downloaded Apr. 22, 2003, http://www.revenews.com/advice/strategy/forcetips.html.

Gennady, M. et al., "NetCash: A design for practical electronic currency on the internet" Association of Computing Machinery, (1993), Information Science Institute, University of Southern California.

* cited by examiner

[x]  Yahoo! - Account Info - Help

Welcome,  Edit Wallet - Options - Sign Out

Yahoo! - PayDirect

Send money - Fill out the information below and click "Continue".  200

| | |
|---:|:---|
| Recipient's name: | ⎵ ~220 |
| Recipient's email: | ⎵ ~230 |
| Message title: (optional) | ⎵ ~240 |
| Message: (optional) | ⎵ |
| Would you like to use identity confirmation? (optional) | ○ yes  ⦿ no   what's identity confirmation?  } 245 |
| If yes, please specifiy a question: | ⎵ ~250 |
| Amount to send: | ⎵ ~210 |
| Pay using account: | PayDirect: |

260 — [Continue] [Cancel]

Copyright © 2000 Yahoo! Inc. All rights reserved. Terms of Service - PayDirect Guidelines
NOTICE: We collect personal information on this site.
To learn more about how we use your information, see our Privacy Policy

☒                                       Yahoo! - Account Info - Help Welcome,                           Edit Wallet - Options - Sign Out

Yahoo! - PayDirect

Request money - Fill out the information below and click "Continue". For a more detailed bill with multiple line items, tax, shipping, click on "add detail" below.

Invoice #: (optional) [          ] ~450      400
           Recipient's name: [            ] ~420
           Recipient's email: [            ] ~430
       Message title: (optional) [           ] ~440
          Message: (optional) [               ]
                      Amount: $[0.00] ~410

460 ~ [Continue] [Cancel] [Add Detail]

Copyright © 2000 Yahoo! Inc. All rights reserved. Terms of Service - PayDirect Guidelines
NOTICE: We collect personal information on this site.
To learn more about how we use your information, see our Privacy Policy

Figure 5

☒                          Yahoo! - Account Info - Help Welcome,                           Edit Wallet - Options - Sign Out

Yahoo! - PayDirect

Group billing - Fill out the information below and click "Continue".    *500*

| | Message title: | | *540* |
|---|---|---|---|
| | Message: | | |

| Recipient name | Recipient email | Amount |
|---|---|---|
| | | |
| | | |
| | | |
| | | |
| | | |

*520* (brace around rows)

Use [5] recipients ☒     *530*     *510*

*550*

[Continue] [Cancel]

---

Copyright © 2000 Yahoo! Inc. All rights reserved. Terms of Service - PayDirect Guidelines
NOTICE: We collect personal information on this site.
To learn more about how we use your information, see our Privacy Policy

Figure 6

[x]  Yahoo! - Account Info - Help

Welcome,        Edit Wallet - Options - Sign Out

Yahoo! - PayDirect

Move money - Select the amount you'd like to move and the accounts you want to use.

Move $ [0.00] ~ 610      600 from [None: xxxxxxxxxxxx0127 ▼] ~ 620 to [PayDirect: 1541-    1 ▼] ~ 630

[Continue] [Cancel]

Copyright © 2000 Yahoo! Inc. All rights reserved. Terms of Service - PayDirect Guidelines
NOTICE: We collect personal information on this site.
To learn more about how we use your information, see our Privacy Policy

Figure 7

SYSTEMS AND METHODS FOR IMPLEMENTING PERSON-TO-PERSON MONEY EXCHANGE

BACKGROUND OF THE INVENTION

The present invention relates generally to online financial transactions, and more particularly to systems and methods for effecting person-to-person online financial transactions.

As more and more individuals become connected to the Internet, the number of e-commerce transaction grows proportionately. Currently, typical e-commerce transactions require individuals to submit confidential information such as credit card information or other bank account information over the Internet to effect a transfer of funds. For example, each time an individual purchases a product from a different merchant over the Internet, the individual must typically submit confidential credit card information to the merchant to complete the purchase transaction. The more an individual transmits such confidential information over the Internet the more opportunity there is for that information to be compromised.

Additionally, it is often difficult for individuals to effect monetary transactions without ultimately having a check sent from the payor to the payee; credit card transactions are not widely available for individuals. For example, in the context of an auction where one individual wins a bid to purchase an item from another individual, the purchaser must usually send a check to the seller. Such transactions are generally undesirable as postage is necessary to send the check, and processing of the check is required. This generally results in an undesirable increase in the amount of time and effort required to complete the transaction.

Accordingly, it is desirable to provide systems and methods for effecting online financial transaction between individuals or between individuals and merchants without the need for sending and cashing checks or transmitting confidential information.

SUMMARY OF THE INVENTION

The present invention provides systems and methods for effecting online financial transactions between individuals or between individuals and entities such as banks, merchants and other companies. The present invention is particularly useful for effecting person-to-person financial transactions.

According to the invention, each user accesses a fund exchange server to establish an online account, which is used to transfer funds to and from other entities' online accounts. An online account is generally a stored value account representing funds held in an account for the user at an affiliated financial institution. Each account, whether an individual account or a corporate account, can have one or more sub-accounts associated therewith. To fund an online account, funds can be transferred to an online account from, for example, a credit card account, direct demand account (DDA), or other financial account or from another online account. To withdraw funds, money can be transferred to a credit card account or other bank account. Any user may initiate a send money transaction or a request payment transaction with any other entity provided that entity is able to receive an electronic message. For example, the receiving entity needs an ID or an e-mail address for an e-mail account to which an electronic message may be sent. The electronic message may be an e-mail message, instant message or other electronic message.

A user, i.e., an entity such as an individual or corporation, that desires to send money to another entity can do so by accessing an existing online account associated with the user and initiating a send money transaction. The user sending money (payor) enters an amount of funds to be transferred and contact information such as a user ID or an e-mail address of the recipient of the funds (payee). The payee may be an individual or other entity such as a corporation. The system sends an electronic message to the payee, for example, using an e-mail address if provided, indicating that the amount of funds has been "received" on the payee's behalf. To effect transfer of the funds, the payee must access the system, for example, by selecting a URL or other link provided in the electronic message, and direct the received funds to an online account. An existing online account may be identified by the payee by providing information such as an account number and/or other identifying information such as a password. If the payee does not have an existing online account, the payee must sign up for an account and provide credit card information or information for a checking account or other bank account sufficient to effect electronic transfer of funds. Thereafter, the received funds can be directed to the newly activated online account. At any point up to the time the received funds are deposited in the payee's online account, the payor can cancel the transaction. Any user may withdraw any or all of the balance in their online account(s) at any time by transferring funds to a credit card account or other bank account.

A request money, or request payment, transaction, e.g. sending a bill, may also be initiated by a user (e.g., individual or corporation) that desires to receive payment from another entity. The user enters an amount of funds owed and contact information such as an e-mail address for the recipient of the payment request (payor). In the case of multiple payors, an amount and contact information (e.g., user IDs and/or an e-mail address) is necessary for each payor. The recipient of such a transaction request (payor) may be an individual or another entity such as a merchant corporation. The system sends a payment request to the payor via an electronic message, for example via e-mail to a provided address, and the payor may respond by selecting a URL or other link provided in the electronic message. If the payor accepts the payment request, the payor identifies an online account from which to transfer funds to the payee (initiator of the payment request). If the payor does not have an online account established, the payor must sign up for an online account and provide credit card information, or information for a checking account or other bank account sufficient to effect electronic transfer of funds, to fund the online account. Thereafter, the amount of funds are transferred to the payee and the system sends an e-mail notification or other electronic message to the payee indicating that the funds have been "received" on the payee's behalf. To complete the transaction, the payee must direct the received funds to an online account, for example, by providing an online account number and/or other identifying information such as a password. The payor may cancel the transaction at any time until the payee directs the received funds to an online account.

According to an aspect of the invention, a computer implemented method of transferring funds from one online account to another is provided. The method typically comprises the step of receiving a transfer request from a first user, the transfer request including an amount of funds for transfer from a first online account associated with the first user and identification information for a recipient of the funds, the identification information including an e-mail address of the recipient. The method also typically includes the steps of automatically sending an e-mail notification to the recipient at the e-mail address, receiving a response from the recipient accepting or rejecting the transfer of funds, and transferring said amount of funds from the first account to a second account associated with the recipient if the response indicates acceptance.

According to another aspect of the invention a computer implemented method of transferring funds from one online account to another. The method typically comprises the steps of opening a first account responsive to a request from a first user to open an account, and receiving a payment request from the first user, the payment request including an amount of funds for transfer to an online account associated with the first user and identification information for a recipient of the payment request (payor), the identification information including an e-mail address of the payor. The method also typically includes the steps of automatically sending an e-mail notification to the payor at the e-mail address, the e-mail notification including the amount of funds to be transferred to the first user, receiving a -payment response -from the payor indicating-acceptance or rejection of the payment request, and sending a second e-mail notification to the first user indicating whether the payment response from the recipient indicates acceptance or rejection of the payment request. If the payment response indicates acceptance, the method typically includes the steps of receiving a transfer request from the first user indicating that the funds be transferred to an identified online account associated with the first user, and transferring funds to the identified online account from a second account associated with the payor in response to the transfer request.

According to yet another aspect of the invention, computer code executed by a computer system in a computer network is provided. The computer system is communicably coupled to a database of user accounts, the user accounts including values representing funds maintained by a financial institution on behalf of the users. The computer system executing the code for updating the values in the user accounts. The code typically includes instructions for processing a transfer request received by the computer system from a first user over the network, the transfer request including an amount of funds for transfer from a first user account associated with the first user and identification information for a second user, the identification information including an e-mail address of the second user, and instructions for automatically sending an e-mail notification to the second user at the e-mail address indicating that funds are ready for transfer to the second user. The computer code also typically includes instructions for processing a response received from the second user to determine whether the second user has accepted or rejected the transfer of funds, and instructions for updating the values of the first user account and a second user account associated with the second user to reflect that the amount of funds was transferred from the first user to the second user if the response indicates acceptance.

According to a further aspect of the invention, computer code executed by a computer system in a computer network is provided. The computer system is communicably coupled to a database of user accounts, the user accounts including values representing funds maintained by a financial institution on behalf of the users. The computer system executing the code for updating the values in the user accounts. The code typically includes instructions for processing a payment request received from a first user over the network, the payment request including an amount of funds for transfer to a first user account associated with the first user and identification information for a second user, the identification information including an e-mail address of the second user, and instructions for automatically sending an e-mail notification to the second user at the e-mail address, the e-mail notification including the amount of funds to be transferred to the first user. The code also typically includes instructions for processing a payment response received from the second to determine whether the second user has accepted or rejected the payment request, instructions for sending a second e-mail notification to the first user indicating whether the payment response from the recipient indicates acceptance or rejection of the payment request, and if the payment response indicates acceptance, instructions for processing a transfer request received from the first user to determine a user account identified by the first user, and instructions for updating the values of the identified account and a second user account associated with the second user to reflect that the amount of funds was transferred from the second user to the first user.

According to yet a further aspect of the invention, a computer implemented method is provided for transferring funds between user accounts in a computer network including two or more affiliate banks, wherein the affiliate banks conduct fund transfer settlements. The method typically comprises the steps of receiving a transfer request to transfer funds from a first online account associated with a first user to a second online account associated with a second user, wherein the transfer request includes a bank identifier that identifies a first one of the affiliate banks, and transferring funds from the first online account to the second online account after the second user has approved the transfer request, wherein the first affiliate bank conducts the fund transfer settlement for the transferred funds on behalf of the first user.

According to still a further aspect of the invention, a computer implemented method is provided for transferring funds between user online accounts in a computer network. The method typically comprises the steps of receiving registration information from a first user for establishing a first online account, the registration information including a physical mailing address, and setting a transaction limit on the first account to a first value. The method also typically includes the steps of thereafter receiving a confirmation code from the first user, wherein the confirmation code confirms that the physical mailing address is a valid address, and thereafter increasing the transaction limit on the first online account to a second value.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying-drawings. In the drawings, like reference numbers indicate identical or functionally similar elements.

DESCRIPTION OF THE SPECIFIC EMBODIMENTS

Figure 1:
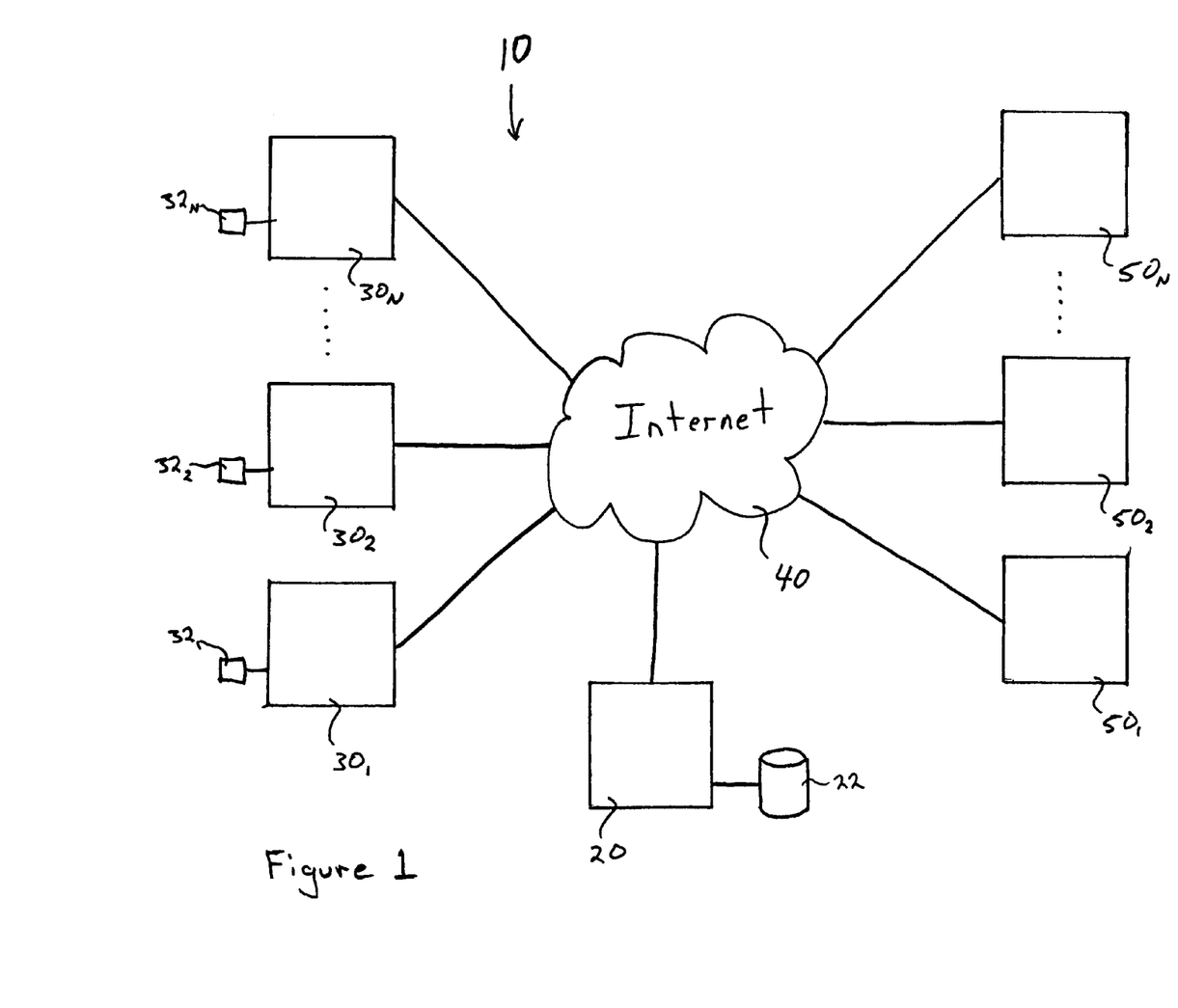
FIG. 1 illustrates a general overview of an information retrieval and communication network including a fund exchange server, client devices, and remote servers according to an embodiment of the present invention.

FIG. 1 illustrates a general overview of an information retrieval and communication network 10 including a fund exchange server 20, client devices $30_1$ to $30_N$, and remote servers $50_1$ to $50_N$ according to an embodiment of the present invention. In computer network 10, clients $30_1$ to $30_N$ are coupled through the Internet 40, or other communication network, to fund exchange server 20 and servers $50_1$ to $50_N$. Only one fund exchange server 20 is shown, but it is understood that more than one fund exchange server can be used, either individually or in a distributed manner, and that other servers providing additional functionality may also be interconnected to any component shown in network 10 either directly, over a LAN or a WAN, or over the Internet.

Several elements in the system shown in FIG. 1 are conventional, well-known elements that need not be explained in detail here. For example, each client device 30 could be a desktop personal computer, workstation, cellular telephone, personal digital assistant (PDA), laptop, or any other device capable of interfacing directly or indirectly with the Internet. Each client 30 typically runs a browsing program, such as Microsoft's Internet Explorer, Netscape Navigator or the like, or a microbrowser such as a WAP enabled browser in the case of a cell phone, PDA or other handheld wireless devices, allowing a user of client 30 to browse pages and forms available to it from fund exchange server 20, servers $50_1$ to $50_N$ or other servers over Internet 40. Each client device 30 also typically includes one or more user interface devices 32, such as a keyboard, a mouse, touchscreen, pen or the like, for interacting with a graphical user interface (GUI) provided by the browser on a monitor screen, LCD display, etc., in conjunction with pages and forms provided by fund exchange server 20, servers $50_1$ to $50_N$ or other servers. The present invention is suitable for use with the Internet, which refers to a specific global Internetwork of networks. However, it should be understood that other networks can be used instead of the Internet, such as an intranet, an extranet, a virtual private network (VPN), a non-TCP/IP based network, any LAN or WAN or the like.

According to one embodiment as will be described in more detail below, fund exchange server 20 and any related components are operator configurable using an application including computer code-run using a central processing unit such as an Intel Pentium processor or the like. Computer code for operating and configuring fund exchange server 20 as described herein is preferably stored on a hard disk, but the entire program code, or portions thereof, may also be stored in any other memory device such as a ROM or RAM, or provided on any media capable of storing program code, such as a compact disk medium, a floppy disk, or the like. Additionally, the entire program code, or portions thereof may be downloaded from a software source to fund exchange server 20 over the Internet as is well known, or transmitted over any other conventional network connection as is well known, e.g., extranet, VPN, LAN, etc., using any communication medium and protocol as are well known. Additionally, portions of the program code may be downloaded or provided to client device 30 and executed on client device 30.

In general, a user accesses and queries fund exchange server 20, servers $50_1$ to $50_N$, and other servers through a client device 30 to view and download content such as news stories, advertising content, search query results including links to various websites and so on. Such content can also include other media objects such as video and audio clips, URL links, graphic and text objects such as icons and hyperlinks, forms, pages and the like. Additionally, such content is typically presented to the user as a web page formatted according to downloaded JavaScript code and HTML code and data as is well known. In general, any Standard Generalized Markup Language (SGML) may also be used. Users are able to communicably access fund exchange server 20, e.g., over the Internet 40, using a client device 30 and conduct transactions, open online accounts and monitor online account activity as will be described herein.

A user typically accesses fund exchange server 20 by selecting or entering the URL identifying the fund exchange server 20. One example of such a fund exchange server 20 is located at the URL https://paydirect.yahoo.com. When accessed, fund exchange server 20 preferably provides the user with one or more web pages including options for opening online accounts, accessing existing online accounts, initiating transactions, responding to transaction requests, etc. If the user has already established an online account they may access an account page by providing an account number and security information such as a password and a security key. The account page preferably includes various status information of pending and past transactions, account balance(s), user preferences, etc., as well as options for initiating various financial transactions. If the user does not have an established account, the user can select to open an account. The user can open an account by providing information such as an e-mail address, a password, mailing address and/or other information as may be necessary.

In general, an "online account" is an online stored value account representing an amount of funds held on the users behalf at an affiliate bank or other financial institution. A database 22 is provided for storing account information and data as is well known. To fund an account, the user must provide credit card information, e.g., credit card number, expiration date, etc, sufficient to effect a transfer of funds from a credit card account to the financial institution holding the user's actual funded account. An ATM check card (e.g., including a Visa logo) may also be used for transfer of funds to and from a checking account. ACH transfers may also be used to transfer funds to and from the affiliate financial institution as are well known. As shown in FIG. 1, each financial institution can be represented as one of servers 50 and a credit card company can be represented as another one of servers 50. A connection may also be established between fund exchange server 20 and credit card server 50 or with financial institution server 50 or with an ACH network server. When a transaction has been completed, transaction information is communicated from fund exchange server 20 to the financial institution server 50, and the user's actual account is credited or debited accordingly. When a user desires to fund an online account or withdraw funds from an online account, the financial institution server handles the actual fund transfers such as credit card debits and credits, ACH transfers and the like.

According to one embodiment, various online financial transactions may be initiated using an established online account, including a "send money" transaction, a "request money" transaction and a "move money" transaction. In a "send money" transaction, one is able to send funds to an entity such as another individual or a merchant, in a "request money" transaction, one is able to receive payment from another entity or entities, and in a "move money" transaction, one is able to transfer funds to and from a credit card account, ATM check card account, checking account, brokerage account, any other financial account, or another online account associated with the user.

Figure 2:
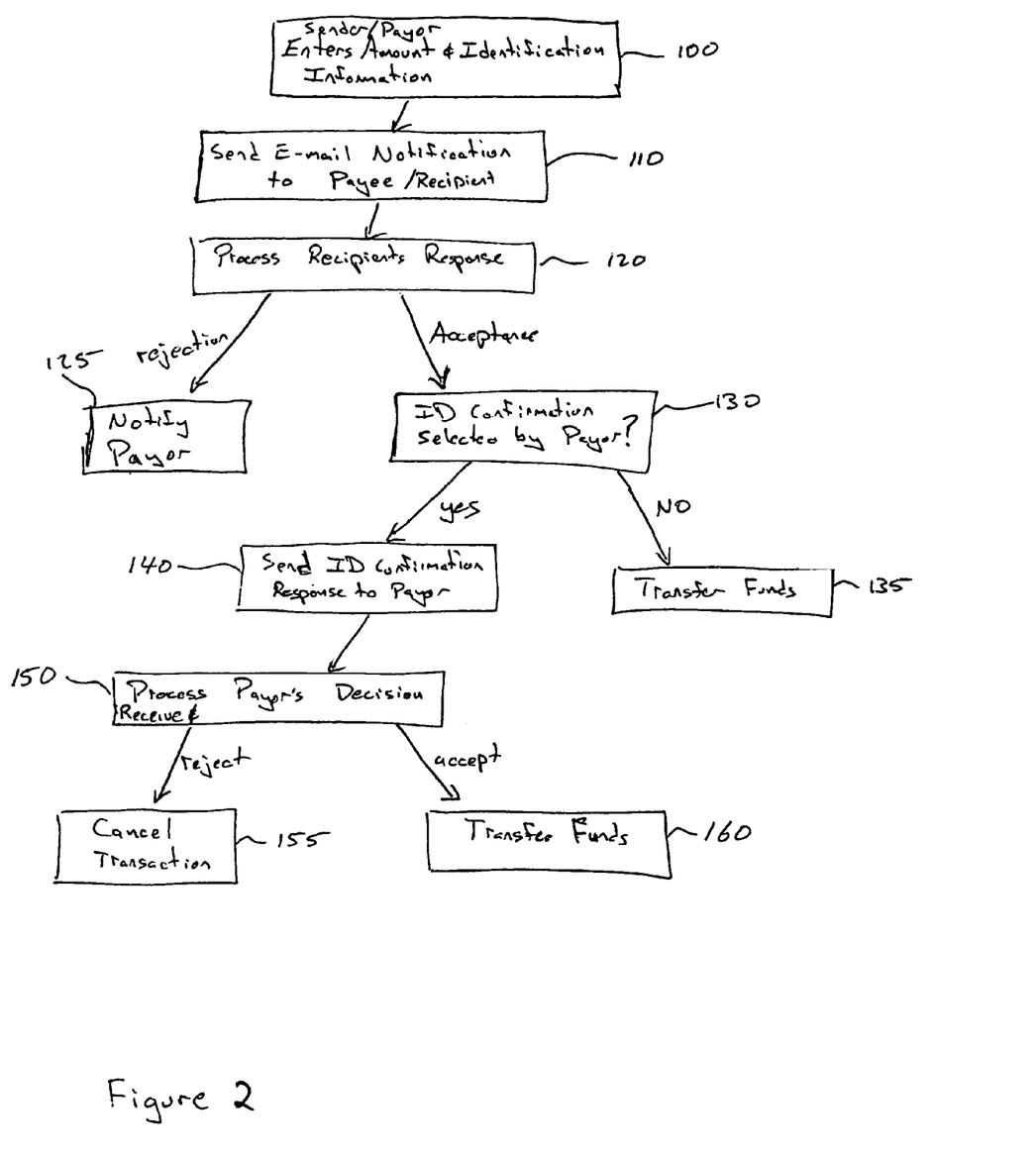
FIG. 2 illustrates the process of conducting a send money transaction according to an embodiment of the present invention.
Figure 3:
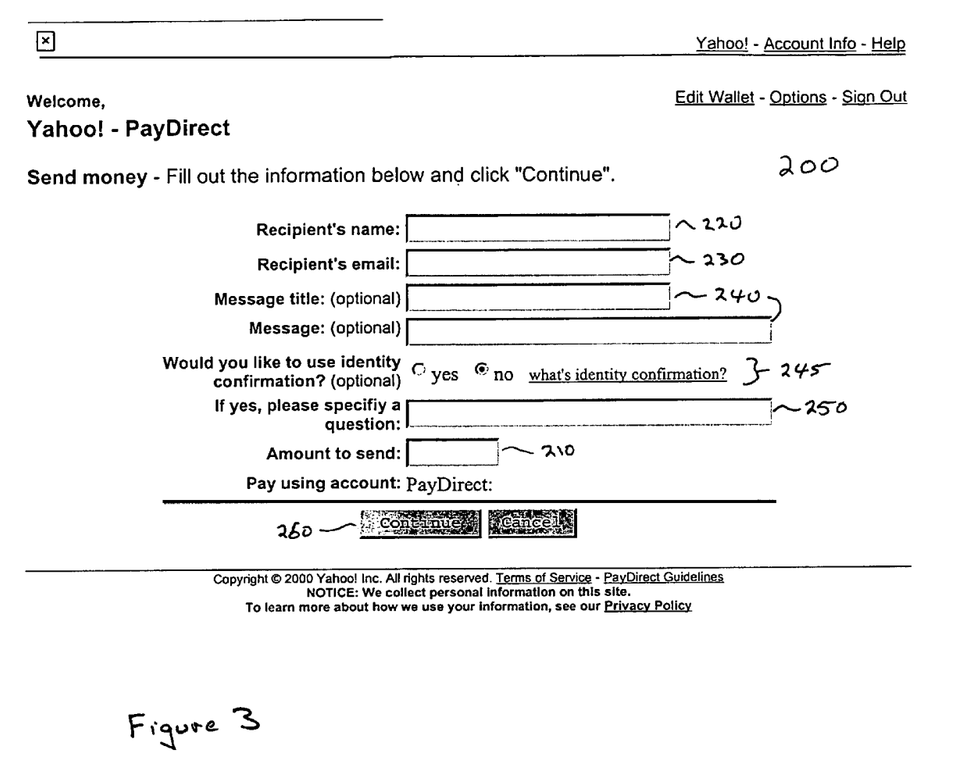
FIG. 3 illustrates an exemplary form for use during a send money transaction according to an embodiment of the present invention.

FIG. 2 illustrates process of conducting a "send money" transaction according to an embodiment of the present invention. In this case, the initiator of the send money transaction is the "payor," and the recipient of the transaction request is the "payee". After the payor has selected the "send money" option, at step 100 the payor is prompted to enter an amount of funds for transfer and identification information for the recipient of the funds (payee). Identification information typically includes a name and an e-mail address of the payee or other contact information such as a user ID for initiating an instant message (IM) session, and may also include an identity confirmation query. For example, in one embodiment as shown in FIG. 3, the payor is presented with a form 200 including an amount field 210, a name field 220, an address field 230, message fields 240, an identity confirmation selection button 245 and a query field 250. The payor then enters the appropriate information in the fields. In a preferred embodiment, amount field 210 and e-mail address field 230 are required to be filled out, and the remaining fields are optional. If the payor selects to use the optionally provided identity confirmation feature, a query must also be input. The payee is later asked to confirm their identity by answering the query to the satisfaction of the payor as will be discussed in more detail below.

After the amount and identification information has been entered and submitted, e.g., by selecting continue button 260, at step 110 the system processes the information and sends an electronic message (e.g., e-mail notification or IM) to the recipient (payee) using the contact information provided by the payor. The electronic message typically includes a link (e.g., URL link or other selectable link) to a web page located on the fund exchange server 20. In one embodiment, the electronic message only alerts the payee that funds are ready to be transferred to the payee, however, the electronic message can include varying amounts of information such as the sender's name, the amount of funds ready for transfer, etc.

Upon selecting the link, a communication session is established between the payee (i.e., using client device 30) and the fund exchange server 20. The payee is provided with a web page or other online document that allows the payee to accept or reject the "send money" transaction. For example, in one embodiment, a form is provided with various fields and selection buttons. If the identity confirmation feature was selected by the payor, the payee is also presented with the identity confirmation query and a field for entering a response to the query. The payee must identify an account into which the funds are to be transferred, e.g., by providing an account number and password. If the payee does not have an account established, an account can be opened as described above. After all appropriate information has been entered and submitted by the payee, the system processes the received information at step 120. If the payee rejected the transaction, at step 125 the payor is notified of the rejection, e.g., by an e-mail notification message or by updating the payor's account page, and the transaction is canceled. If the payee has accepted the transaction, the system determines whether identity confirmation is active for the current transaction in step 130. If the identity confirmation feature was not selected by the payor, in step 135 the funds are transferred from the payor's account to the account identified by the payee. If the identity confirmation feature was selected, in step 140 the payor is notified, preferably by an electronic message, that the payee has responded to the identity confirmation query. Preferably, the response is included in an electronic message along with a URL link to the system, however, the response can be posted to the payor's account page for review the next time the payor logs into the system.

If the payor is satisfied with the information provided in the identity confirmation response, the payor responds to the system with a decision. For example, the payor may select an accept button or a reject button. At step 150, the system receives and processes the payor's decision. If the payor rejected the identity confirmation response, the transaction is canceled in step 155. If the payor accepted the response, in step 160 the funds are transferred from the payor's account to the account identified by the payee. The payor can cancel the transaction at any time until the funds are transferred to the payee's account.

Figure 4:
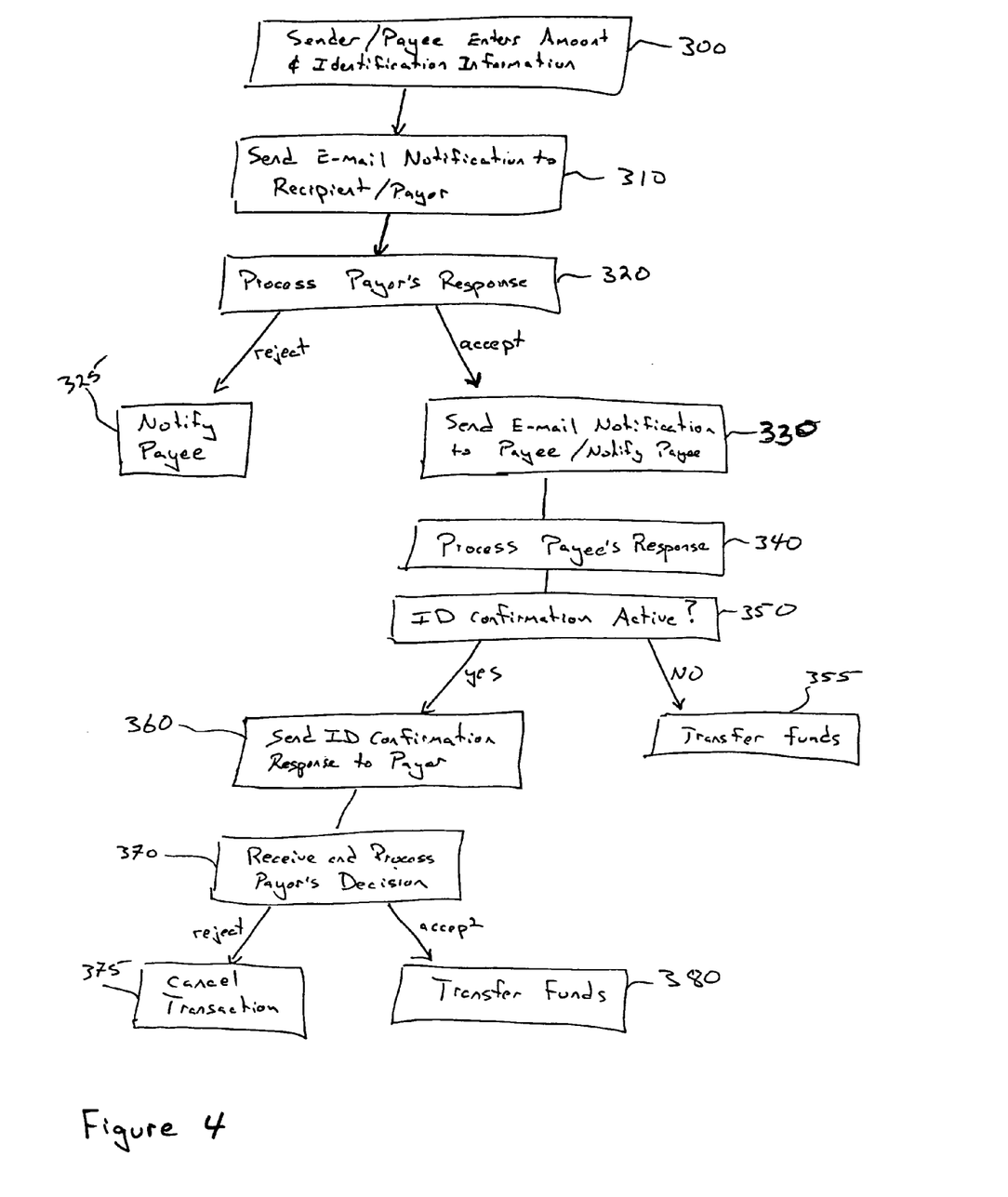
FIG. 4 illustrates the process of conducting a request money transaction according to an embodiment of the present invention.
Figure 5:
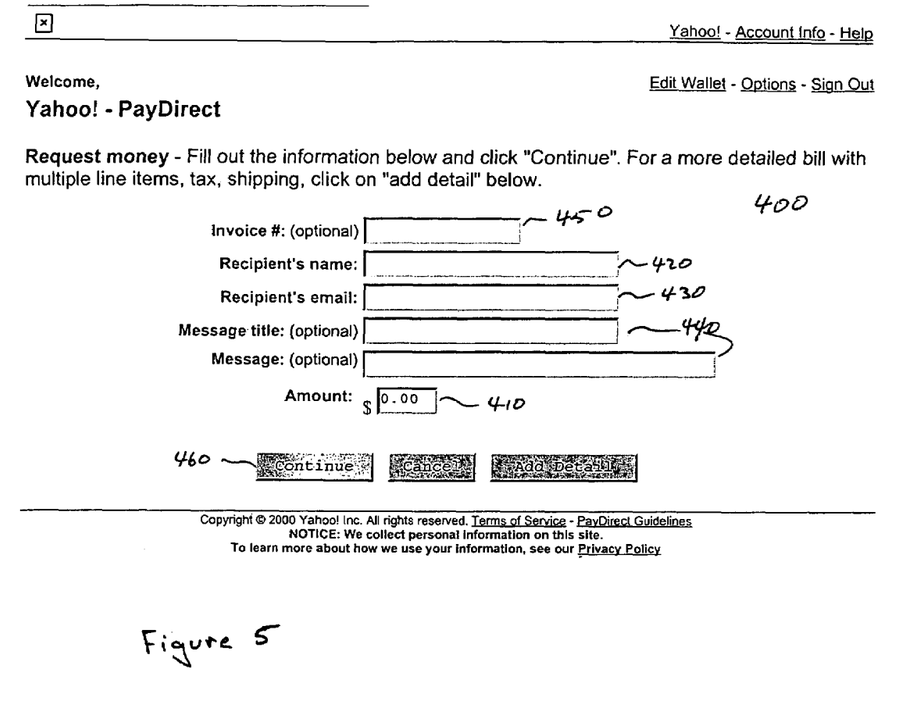
FIG. 5 illustrates an exemplary form for use during a request money transaction according to an embodiment of the present invention.

FIG. 4 illustrates the process of conducting a "request money" transaction according to an embodiment of the present invention. In this case, the initiator of the request money transaction is the "payee," and the recipient of the transaction request is the "payor". After the payee has selected the "request money" option from the account page, at step 300 the payee is prompted to enter an amount of funds for transfer and identification information for the recipient of the payment request (payor). Identification information typically includes a name and an e-mail address of the payor or other contact information such as a user ID for initiating an instant message (IM) session. For example, in one embodiment as shown in FIG. 5, the payee is presented with a form 400 including an amount field 410, a name field 420, an address field 430, message fields 440, and an invoice field 450. The payee enters the appropriate information in the fields. In a preferred embodiment, amount field 410 and e-mail address field 430 are required to be filled out, and the remaining fields are optional.

After the amount and identification information has been entered and submitted, e.g., by selecting continue button 460, at step 310, the system processes the information and sends an electronic message (e.g., e-mail notification or IM) to the recipient (payor) using the contact information provided by the payee. The electronic message typically includes a link (e.g., URL link or other selectable link) to a web page located on the fund exchange server 20. In one embodiment, the electronic message only alerts the recipient that a payment request, e.g., invoice or bill, has been received, however, the electronic message can include varying amounts of information such as the sender's name, the amount of funds desired to be transferred, etc.

Upon selecting the link, a communication session is established between the payor (i.e., using client device 30) and the fund exchange server 20. The payor is provided with a web page or other document that allows the payor to accept or reject the "request money" transaction. For example, in one embodiment, a form is provided with various fields and selection buttons. The payor must identify an account from which the funds are to be transferred, e.g., by providing an account number and password. If the payor does not have an account established, an account can be opened and funded as described above. If the payor accepts the transaction they are provided with the ability to select the identity confirmation feature. If the identity confirmation feature is selected, the payor must enter a query. After all appropriate information has been entered and submitted by the payor, the system processes the received information at step 320. If the payor rejected the transaction, in step 325 the payee is notified of the rejection, e.g., by an electronic message or by updating the payee's account page. If the payor has accepted the transaction, in step 330 the system notifies the payee, e.g., by sending an electronic to the payee indicating that the transaction has been accepted by the payor. In one embodiment, the payor may select to accept the transaction in part, in which case the payor must enter the partial payment amount. The partial payment amount is also communicated to the payee, either in an electronic message indicating acceptance or by posting to the payee's account page. If the payor has selected the optional identity confirmation feature, the query is also communicated to the payee, either in an electronic message indicating acceptance or by posting to the payee's account page. The electronic message also typically includes a link to a web page located on the fund exchange server 20.

Upon selecting the link, a communication session is established between the payee (e.g., using client device 30) and the fund exchange server 20. The payee is provided with a web page that allows the payee to direct the "received" funds to an online account. For example, in one embodiment, the payee is provided with an account page for an account associated with the payee. Alternately, or in addition, a form is provided with various fields and selection buttons. If the identity confirmation feature was selected by the payor, the payee is also presented with the identity confirmation query and a field for entering a response to the query. The payee must identify an account into which the funds are to be transferred, e.g., by designating the account associated with the active account page, or by providing an account number and password for another account associated with the payee. If desired, the payee may open another account as described above.

After all appropriate information has been entered and submitted by the payee, the system processes the received information at step 340. The payee may also be provided with an option to cancel the transaction at this point. At step 350, the system determines whether identity confirmation is active for the current transaction. If the identity confirmation feature was not selected by the payor, in step 355 the funds are transferred from the payor's account to the account identified by the payee. If the identity confirmation feature was selected, in step 360 the payor is notified, preferably by an electronic message, that the payee has responded to the identity confirmation query. Preferably, this response is included in an electronic message along with a URL link to the system, however, the response can be posted to the payor's account page for review the next time the payor logs in to the system.

If the payor is satisfied with the information provided in the identity confirmation response, the payor responds to the system with a decision. For example, the payor may select an accept button or a reject button. At step 370, the system receives and processes the payor's decision. If the payor rejected the identity confirmation response, the transaction is canceled in step 375. If the payor accepted the response, in step 380 the funds are transferred from the payor's account to the account identified by the payee. The payor can cancel the transaction at any time until the funds are transferred to the payee's account.

Figure 6:
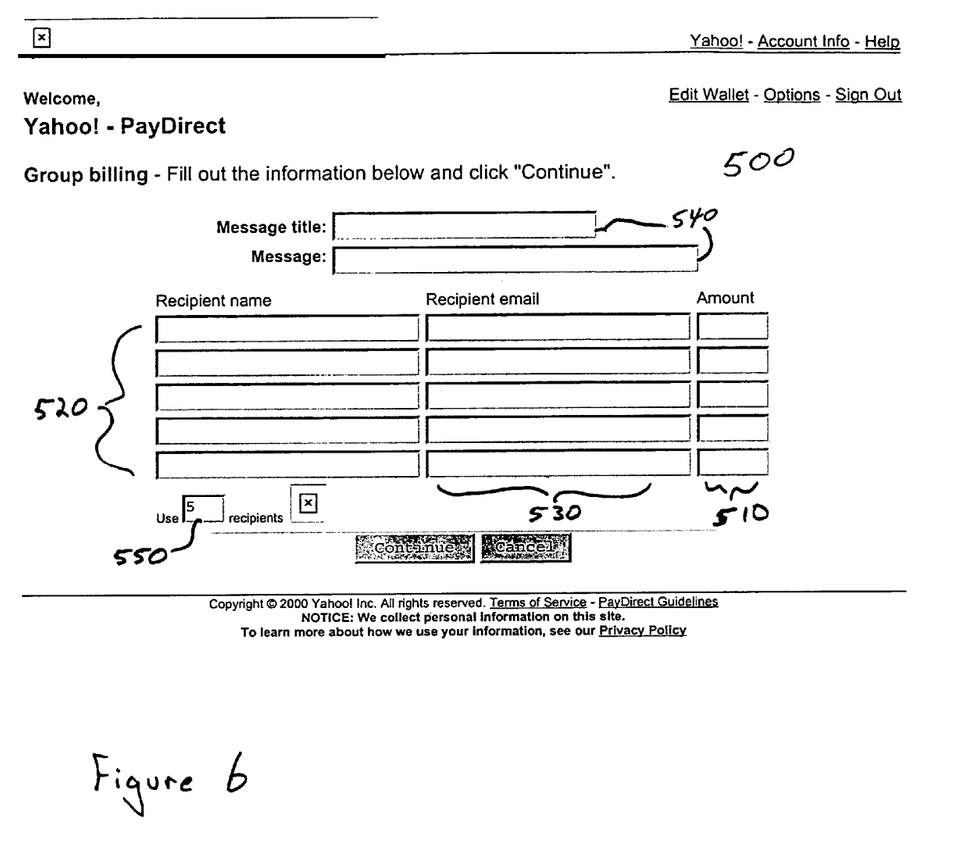
FIG. 6 illustrates an exemplary form for use during a request money transaction involving multiple recipients according to an embodiment of the present invention.

In one embodiment, a multiple payor bill may be submitted as part of a "request money" transaction. FIG. 6 illustrates an exemplary form 500 for use during a request money transaction involving multiple recipients (payors) according to an embodiment of the present invention. Form 500 preferably includes amount fields 510, name fields 520, address fields 530, message fields 540, and a selection field 550 for selecting the number of recipients. The payee enters the appropriate information in the fields, submits the form, and the system thereafter submits transaction requests to each individual payor and conducts transaction processing individually as described above with reference to FIG. 4.

In a "move money" transaction, funds are transferred to and from an online account. According to one embodiment, funds may be withdrawn from an online account to a credit card account, an ATM check card account, checking account or other financial account. According to another embodiment, funds may be transferred to an online account from a credit card account, an ATM check card account, checking account or other financial account. The financial institution server 50 effects the transfer of the actual funds with the appropriate account server, e.g., credit card server, ACH network server, bank server, etc. In another embodiment, funds may be transferred between online accounts associated with the user. For example, the user may have two or more separate online accounts or one or more online sub-accounts may be tied to a master online account. For sub-accounts, actual funds are debited or credited to an account at the financial institution associated only with the master account, such that when an online transaction involving a sub-account is completed actual funds may, only be withdrawn from, or added to, the master account. Funds may be moved between the master account and a sub-account by the entity controlling the master account. Sub-accounts are useful for many applications, including, for example, allowing parents (controlling master account) to provide a monthly allowance to a child (sub-account) away at college or providing a limited spending account (sub-account) for an employee in charge of buying office supplies for a company (controlling master account).

Figure 7:
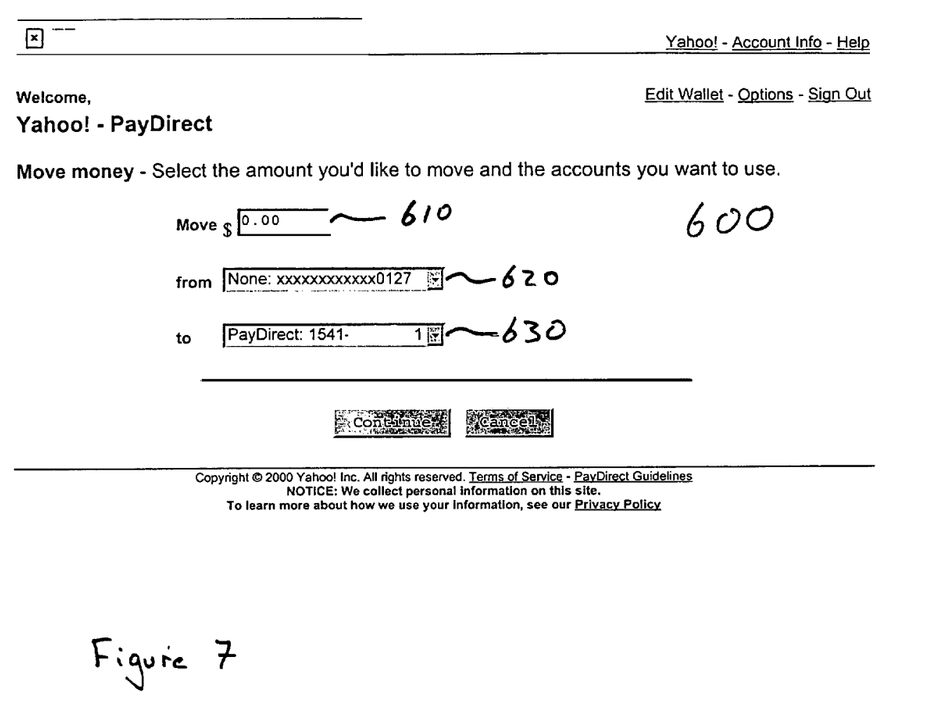
FIG. 7 illustrates an exemplary form for use with a "move money" transaction according to an embodiment of the invention.

To effect transfer between online accounts and between an online account and a credit card account, ATM check card account, checking account or other financial account, the user is preferably provided with a form with fields for entering the amount desired to be transferred, the account into which funds are to be transferred and the account from which funds are to be transferred. FIG. 7 illustrates an exemplary form for use with a "move money" transaction according to an embodiment of the invention. As shown, form 600 preferably includes an amount field 610, an account field 620 from which funds are to be transferred and a second account field 630 into which funds are to be transferred. Other fields may be presented for other necessary information such as passwords, PIN numbers, expiration dates, routing numbers, etc. If a user has previously entered account information, the user is preferably able to select that account without having to re-enter the information. When filled out, the user submits the form and the system processes the information and moves the funds accordingly. For online account-to-online account moves, the database 22 is updated, and for transfers to and from online accounts, financial institution server 50 is provided with the appropriate information so as to effect the actual transfer of funds to or from the credit card account, conduct ACH settlement, etc.

According to one embodiment, multiple affiliate banks are provided for conducting settlements, e.g., ACH settlements with other banks, check card transactions, transactions with credit card companies, etc. Referring to FIG. 1, for example, one affiliate financial institution may be represented as server $50_1$, and a second financial institution as server $50_2$. In this embodiment, a user is preferably given an option to choose an affiliate bank to conduct the settlements. For example, the different affiliate financial institutions may offer different fee schedules, award programs, etc. After a user selects an affiliate financial institution, that institution becomes the default until changed by the user. In one embodiment, both parties to a transaction (i.e., payor and payee) may identify the same or different affiliate financial institutions for conducting settlement for the transaction. Additionally, different default affiliate banks may be selected by a user depending on the type of settlement. In preferred aspects, database 22 stores the affiliate bank preferences and other user preferences in relation to each online account.

According to another embodiment, a transaction limit is placed on an online account until it has been established that the user is able to receive mail at a billing address, e.g., for a credit card or ATM check card. In this embodiment, the user is limited to sending or receiving no more than a certain amount, for example, $200, until the user has verified that they are able to receive U.S. mail at the billing address. When the user signs up or registers with the system, a letter is sent to the billing address. The letter includes a code, such as an alphanumeric code. After the letter and code have been received, the user can verify/confirm the physical billing address by entering the code when logging in to the system. Once the physical address has been confirmed, the transaction limit may be raised. In one embodiment, the transaction limit is automatically raised, for example, to the lesser of $1000/month or the credit card limit, if credit card information was entered. Alternatively, the transaction limit may be set by the user, within a specified maximum set by the system. It will also be appreciated that any transaction limit determining scheme may be used.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer implemented method of transferring funds from an online account associated with a first user to a recipient online account, the method comprising:

receiving a transfer request from the first user, the transfer request including an amount of funds for transfer from the online account and identification information for a recipient of the funds, the identification information including an electronic message address associated with the recipient, further wherein the transfer request includes a request for identity confirmation;

automatically sending an electronic message to the recipient using the electronic message address, the electronic message indicating that funds are ready for transfer to the recipient and requesting a response from the recipient for the identity confirmation;

receiving the response from the recipient accepting or rejecting the transfer of funds wherein the response includes a request by the recipient to open an account upon an acceptance of the transfer of funds, further wherein the response includes the response for the identity confirmation;

sending an electronic message to the first user notifying the first user whether the recipient rejects the transfer of funds, wherein the electronic message includes the response for the identity confirmation;

initiating opening the recipient online account for the recipient upon the acceptance of the transfer of funds;

receiving from the first user an acceptance or a rejection of the identity confirmation; and transferring said amount of funds from the first account to the recipient online account associated with the recipient upon the acceptance of the transfer of funds and upon acceptance of the identity confirmation.

2. The method of claim 1, wherein the electronic message address comprises an e-mail address, and wherein the electronic message is an e mail message.

3. The method of claim 1, wherein the electronic message address includes a user ID associated with the recipient, and wherein the step of automatically sending an electronic message includes initiating an instant message session with the recipient based on the user ID.

4. A computer implemented method of transferring funds from an online account for a first user to a recipient online account, the method comprising the steps of:

receiving a transfer request from the first user, the transfer request including an amount of funds for transfer from the first online account and identification information for a recipient of the funds, the identification information including an electronic message address for the recipient, wherein the transfer request further includes a request for identity confirmation using a query;

automatically sending an electronic message to the recipient using the electronic message address, the electronic message indicating that funds are ready for transfer to the recipient and including the request for identity confirmation;

receiving a response from the recipient accepting or rejecting the transfer of funds wherein when the recipient accepts the transfer of funds, the response from the recipient includes identity confirmation with an answer to the query;

sending an electronic message to the first user notifying the first user whether the response from the recipient rejects the transfer;

automatically sending the identity confirmation to the first user;

receiving from the first user an acceptance or a rejection of the identity confirmation based on the answer to the query; and transferring said amount of funds from the first account to the recipient account when the response from the recipient indicates acceptance and the first user accepts the identity confirmation.

5. The method of claim 4, wherein the request for identity confirmation includes the query, and wherein the identity information from the recipient includes the answer to the query.

6. The method of claim 1, further including the step of opening the first account in response to a request from the first user to open the first account.

7. The method of claim 1, wherein the method is implemented in a host server, and wherein the electronic message includes a URL link to the host server.

8. In a computer network, a computer system communicably coupled to a database of user accounts, the user accounts including values representing funds maintained by a financial institution on behalf of the users, the computer system executing code for updating the values in the user accounts, the code including instructions for:

processing a transfer request received by the computer system from a first user over the network, the transfer request including an amount of funds for transfer from a first user account associated with the first user and identification information for a second user, the identification information including an electronic message address for the second user, wherein the transfer request further includes a request for identity confirmation;

automatically sending an electronic message to the second user using the electronic message address, the electronic message indicating that funds are ready for transfer to the second user and requesting a response from the second user accepting or rejecting the transfer of funds;

processing the response received from the second user to determine whether the second user has accepted or rejected the transfer of funds, wherein the response includes a request by the second user to open an account;

sending an electronic message to the first user notifying the first user whether the second user has rejected the transfer of funds;

opening a second account for the second user;

receiving information identifying the second account for the second user;

automatically sending an electronic message to the first user with identification information for the second account associated with the second user and providing a response from the second user for the identity confirmation; and updating the values of the first user account and the second account associated with the second user to reflect that the amount of funds was transferred from the first user to the second user when the response received from the second user indicates acceptance and the first user accepts the response from the second user for the identity confirmation.

9. The system of claim 8, wherein the electronic message address is an e mail address, and wherein the electronic message is an e-mail message.

10. The system of claim 8, wherein the electronic message address includes a user ID associated with the second user, and wherein the step of automatically sending an electronic message includes initiating an instant message session with the second user based on the user ID.

11. In a computer network, a computer system communicably coupled to a database of user accounts, the user accounts including values representing funds maintained by a financial institution on behalf of the users, the computer system executing code for updating the values in the user accounts, the code including instructions for:

processing a transfer request received by the computer system from a first user over the network, the transfer request including an amount of funds for transfer from a first user account associated with the first user and identification information for a second user, the identification information including an electronic message address for the second user, wherein the transfer request further includes a request for identity confirmation comprising a query to be answered by the second user;

automatically sending an electronic message to the second user using the electronic message address, the electronic message indicating that funds are ready for transfer to the second user and requesting an answer to the query for the identity confirmation;

processing a first response received from the second user to determine whether the second user has accepted or rejected the transfer of funds, wherein the first response from the second user includes the identity confirmation comprising the answer responsive to the query;

automatically sending the identity confirmation including the answer to the first user;

processing a second response received from the first user indicating acceptance or rejection of the identity confirmation based on the answer from the second user; and updating the values of the first user account and a second user account associated with the second user to reflect that the amount of funds was transferred from the first user to the second user when the first response indicates acceptance and when the second response indicates acceptance of the identity confirmation, further wherein when the identity confirmation is not accepted, the second response indicates the first user rejects the identity confirmation and rejects the transfer.

12. The computer system of claim 11, wherein the request for identity confirmation includes a query, and wherein the identity information from the second user includes an answer to the query.

13. A computer implemented method of transferring funds between user accounts in a computer network including a plurality of affiliate banks, wherein the affiliate banks conduct fund transfer settlements, the method comprising the steps of receiving a transfer request to transfer funds from a first online account associated with a first user to a second online account associated with a second user, wherein the transfer request includes a bank identifier that identifies a first of the plurality of affiliate banks and the transfer request includes an identity confirmation with a query for the second user; and transferring funds from the first online account to the second online account after the second user has approved the transfer request and the first user receives and verifies identity information including verifying the identity confirmation with an answer to the query from the second user;

wherein the identified first affiliate bank conducts the fund transfer settlement for the transferred funds on behalf of the first user.

14. The method of claim 13, wherein the settlement includes one of a check card transaction or a credit card transaction.

15. The method of claim 13, wherein the transfer request includes an electronic message address for the second user, wherein the method further includes the step of automatically sending an electronic message to the second user using the electronic message address, wherein the electronic message indicates that funds are ready for transfer to the second user.

16. The method of claim 15, wherein the electronic message address is an e mail address, and wherein the electronic message is an e mail message.

17. The method of claim 15, wherein the electronic message address includes a user ID associated with the second user, and wherein the step of automatically sending an electronic message includes initiating an instant message session with the second user based on the user ID.

18. The method of claim 13, further including the step of receiving a second bank identifier from the second user, the second bank identifier identifying one of the affiliate banks for conducting fund transfer settlement on behalf of the second user.

19. The method of claim 18, wherein the first and second bank identifiers indicate the same affiliate bank.

20. The method of claim 13, wherein the transfer request includes a request from the first user to pay funds to the second user.

* * * * *

UNITED STATES PATENT AND TRADEMARK OFFICE
CERTIFICATE OF CORRECTION

| | | |
|---|---|---|
| PATENT NO. | : 7,373,329 B2 | Page 1 of 1 |
| APPLICATION NO. | : 10/727303 | |
| DATED | : May 13, 2008 | |
| INVENTOR(S) | : Paul Gallagher et al. | |

It is certified that error appears in the above-identified patent and that said Letters Patent is hereby corrected as shown below:

In column 14, in claim 11, line 5, before "includes a request" delete "farther" and substitute --further-- in its place.

Signed and Sealed this

Third Day of February, 2009

JOHN DOLL
*Acting Director of the United States Patent and Trademark Office*